CRYOGENIC THIN FILM APPARATUS

Filed April 3, 1964

INVENTOR
REX H. BLUMBERG

Frederick D. Poag
ATTORNEY

United States Patent Office 3,369,224
Patented Feb. 13, 1968

3,369,224
CRYOGENIC THIN FILM APPARATUS

Rex H. Blumberg, Hyde Park, N.Y., assignor to International Business Machines Corporation, New York, N.Y., a corporation of New York Filed Apr. 3, 1964, Ser. No. 357,157
9 Claims. (Cl. 340—173.1)

ABSTRACT OF THE DISCLOSURE

A means for sampling a magnetic field in a super-conductive device nondestructively employs the fact that a thin film of super-conductive material having magnetic fields H1 and H2 applied to the opposite sides thereof will remain in its super-conductive state if the fields are of the same sense, while switching if fields are of the opposite sense. When the film switches to resistive condition, it is no longer a barrier between fields H1 and H2, a fact which can be employed as one means of detecting the fact that the film has switched. H1 results from trapped flux data storage which has been entered in a sheet film memory element at one side of the barrier film. H2 is set up by operation of drive lines aligned with the memory site but at the other side of the barrier film. The flux H2 may or may not penetrate the barrier film depending on its polarity relationship to flux H1. If H2 does penetrate, the resulting distortion of the fields can be detected.

This invention relates to the art of super-conductive devices and more particularly to improved apparatus for sensing a field condition in cryogenic memory and similar devices.

The art of cryogenic circuitries, including memory schemes, has developed rapidly in recent years and there are now well known cryogenic gates, flipflops, and trapped flux memory devices. Since cryogenic devices lack resistivity when in their super-conductive state, it is frequently the current rather than voltage pattern in a circuit which is indicative of the status of the circuit, and the magnetic field associated with that current is a useful means for measuring its presence or absence, sense, and amplitude.

For example, one method of reading out the information stored in a trapped flux memory device is to provide current drive lines which apply M.M.F. to the device in a direction which is indicative of the "0" state of the device. Another current line, inductively coupled to the field of the device, is responsive to the change in that field. Thus, if the data stored by the device was already a "0" there is no substantial change in the field when the device is "read" by being driven toward its "0" state, while if it had been in its "1" state, the change in the field upon the device being driven to its "0" state would be substantial and sensed by the output line. Unfortunately, this kind of read-out scheme is destructive of the information stored in the memory device so that if that information is to be retained, some buffer arrangement for retaining it is needed.

In accordance with the present invention, an improved means is provided to sense a low energy field condition, such as is often encountered in trapped field memory devices, without changing the stored energy of that field. At the same time the apparatus of the invention may be arranged in such manner that the transients involved in sampling the field do not increase the circulating currents associated with the trapped flux even temporarily, so that there is no danger of driving the trapped flux device normal.

In an article published in the Physical Review, vol. 124, No. 3 (Nov. 1, 1961), D. H. Douglass Jr. shows that the super-conducting penetration depth for very thin films is a function of the relationship of the fields at opposite sides of the film. In an article published in Soviet Physics-Technical Physics, vol. 8, No. 7 (January 1962), V. Ya. Kontarev shows this principle in terms of the field penetrating inside a cylindrical cavity as a function of the external field. Thus, it is known that asymmetry in the field at opposite sides of a thin super-conducting film has an effect on the critical field of the film. As shown by Kontarev, a plot of super-conductivity of such a film, wherein the ordinate and abscissa values are the fields on opposite sides of the film, assumes an elongate pattern with its major axis extending in the first and third quadrants. In other words, the ability of the film to withstand external fields and remain super-conductive is much greater if the fields on its opposite sides are of the same sense rather than of opposite sense.

In accordance with the present invention utilization of these phenomena is made to provide a field polarity detector which operates by the effect of fields on its opposite sides, for example by a field of unknown polarity on one side and a test field of known polarity on the other. The asymmetric response of the film to fields in accordance with their polarity is utilized to determine the polarity of the unknown field without change in its energy level, and, when the film remains super-conductive, without direct communication with the unknown field at all.

Accordingly it is an object of the present invention to provide a cryogenic apparatus having improved means for sensing a field condition within the apparatus.

Another object of the invention is to provide a field sensing means as aforedescribed which is sensitive to low energy fields without changing the energy level of the field.

Still another object of the invention is to provide a cryogenic apparatus as aforesaid wherein improved isolation is provided between inquiry circuits of the device and the field being sensed.

Still another object of the invention is to provide an improved cryogenic apparatus having non-destructive readout characteristics.

The foregoing and other objects, features and advantages of the invention will be apparent from the following more particular description of a preferred embodiment of the invention, as illustrated in the accompanying drawings.

Figure 1:
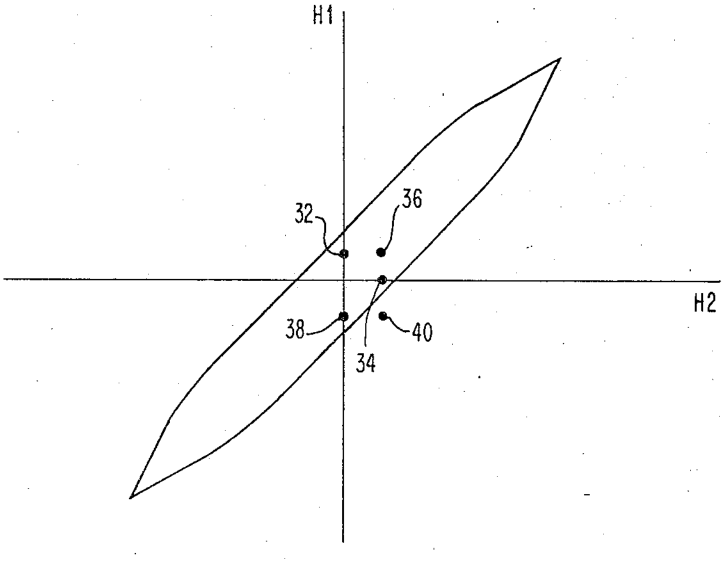
FIG. 1 is a plot of the super-conductive operating characteristics of a thin cryogenic film as a function of magnetic field strength at opposite sides of the film.

In the plot of FIG. 1 the ordinant values H1 represent the field strength on one side of a thin super-conducting film, while the abscissa values H2 represent the field strength on the other side. For values bounded by the closed curve extending in the first and third quadrants of the plot, the film is super-conductive and operates as a perfect magnetic shield between the fields H1 and H2. Outide of that bounded area, the critical field has been exceeded and the film is normally conducting so that magnetic fields can penetrate through it. The above referenced Douglass article shows that the aspect ratio of this curve can be controlled by the thickness of the super-conductive film; for purposes of employments in accordance with the present invention a relatively long narrow shape as shown in FIG. 1 hereof is preferred, and this can be obtained by making the super-conductive film quite thin, for example it may be a tin film in the order of 300 or 400 angstroms in thickness.

Moreover, as will be explained more fully hereinafter, it is preferred in the illustrated embodiment of the invention that the field sensitive film employed be such as to not trap flux. Accordingly, it is preferred that the film be deposited at a low, such as liquid nitrogen, temperature on a well-nucleated substrate so as to have a fine grain free from such geometries or imperfections as would operate to set up flux trapping current patterns. A film 10 of this kind is employed in FIG. 2 in a trapped flux memory device in accordance with the invention.

In the diagrammatic showing of this device, the insulating layers are omitted, for clarity, and the vertical scale is greatly enlarged so that the very thin layers and their flux inter-relations can be shown. In the example diagrammed, a conventional trapped flux memory element 12 is provided with drive lines 14, 16, for writing a data-indicating trapped flux condition H1 in and through a site in the film 12 associated with the drive lines 14, 16. The film 12 may be a tin film of one thousand angstroms thickness which has been deposited at room temperature in such a manner as to contain imperfections which provide the site for flux trapping, or it may be manufactured with otherwise contoured apertures for the same purpose, all as is well understood in the art. Also as in the prior art, the apparatus includes a sense conductor 18 in association with the memory site. In a prior art arrangement, the sense conductor 18 responds to the change in the trapped flux H1 when the memory site in the film 12 is driven to its "0" data status. This is accomplished by driving the site normal by operation of an M.M.F. exerted by currents of appropriate polarity and intensity on lines 14, 16.

In contrast, in the illustrated embodiment of the present invention the lines 14, 16 are used only for writing information in the flux trapping site of the film 12, non-destructive means including the film 10 being provided for readout purposes. For carrying out this function, a second set of drive lines 20, 22 are provided for "Read" or inquiry purposes only, these drive lines being arranged for energization to provide a field H2 for cooperation with the film 10, to test the polarity of the field H1 at the other side thereof. It will be understood that the drive lines 14, 16 and 20, 22 address the illustrated memory site for operation, in accordance with well-established principles of the prior art. Accordingly, these controls are shown schematically at 22, 24, 26 and 28, as is the output responsive device 30 coupled to the sense line 18.

The various conductor lines 14, 16, 18, 20 and 22 may be of lead or any other suitable material, and the insulation between the several layers may be silicon monoxide, or any other suitable material, the entire assembly being deposited on a suitable non-conducting sub-layer or substrate and maintained at a cryogenic temperature below the critical temperatures of the films 10, 12 so that the later are maintained normally in their super-conducting condition.

Figure 2:
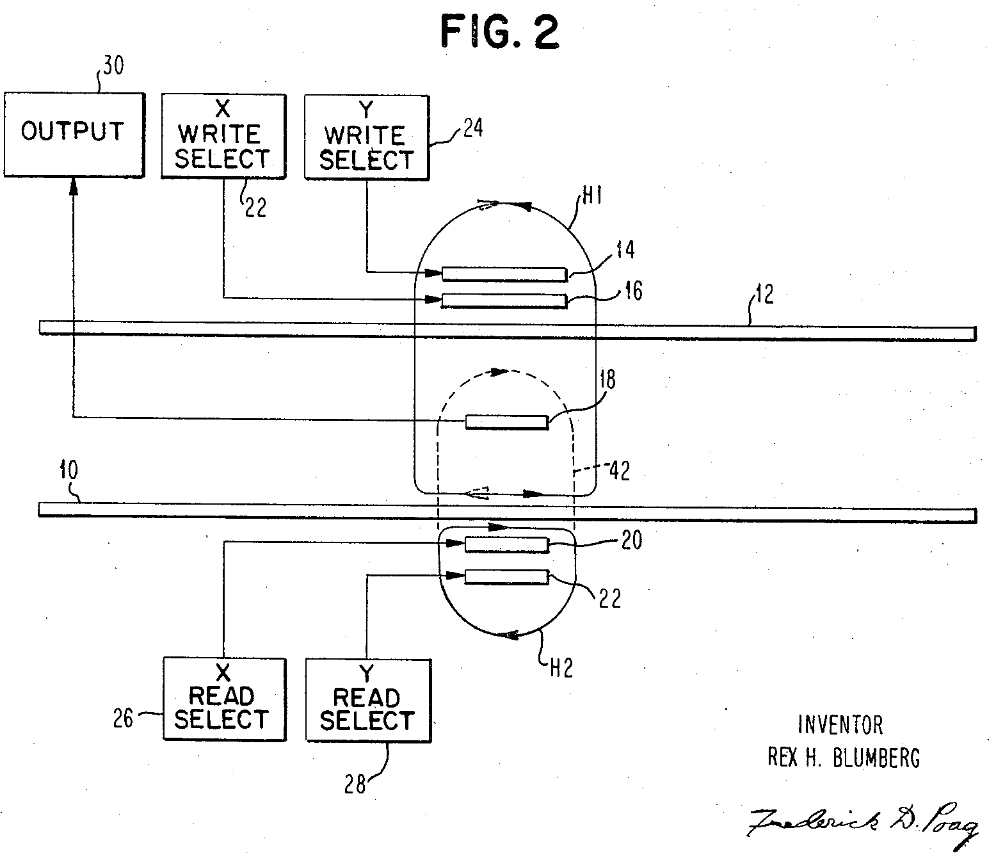
FIG. 2 is a schematic diagram of a portion of a memory apparatus in accordance with the present invention operable in a manner defined by the operating characteristics of FIG. 1.

In the arrangement of FIG. 2 operation of the "Write" lines 14, 16 can, as in the prior art, set up a flux H1 which is trapped by the memory plane 12 and has a polarity indicative of the "1"–"0" data bit to be stored at the site defined by the write elements 14, 16 and the associated flux trapping portion of the film 12. For example, a flux H1 which is counter-clockwise as shown in the drawing may be indicative of a "0" while a flux H1 which is clockwise as shown in the drawing may be indicative of a "1." As shown in the drawing this flux H1 links the sense element 18 and is bounded by the surface of the film 10 when the latter is in its super-conductive condition. When this flux is counter-clockwise as shown in the drawing, it proceeds from left to right along the upper surface of the film 10, and this will be considered the +H1 direction in the ensuing discussion. For example, it may have a value 32 as shown in FIG. 1.

The sense or "Read" conductors 20, 22 are arranged and energized to provide a test flux H2, which in the present instance is clockwise so that it has a component bounded by the lower surface of the plane 10 and travels in the left-to-right direction as seen in the diagram, which direction is + in accordance with abscissa designations of FIG. 1 and may have the value 34 therein. Accordingly, the operating point of the film 10 when subjected to a +H1 value of 32 and a +H2 value of 34 is at the intersection 36 of that ordinant and abscissa, in the superconducting region of the operating characteristics.

However, if the field H1 is instead clockwise as seen in FIG. 2 so as to represent the storage of a "1," it is of relatively opposite sign as compared to the test field H2 and may have a value of 38, FIG. 1. The resulting combined condition with the test field 34 is represented by the intersection 40 which falls outside of the super-conducting region of FIG. 1. Thus, the associated portion of film 10 goes normal, that is, becomes normally resistive. This allows the flux H2 to penetrate the film 10 and link the sense line 18 as shown as 42. The resultant change in the field environment linking the conductor 18 results in the generation of an E.M.F. therein which is sensed as a "1" by the output device 30. Although the field H1 is distorted during this operation, the readout is in no way dependent upon the destruction of the field H1 as in the aforedescribed prior art arrangement. Rather, the relative polarities of the fields H1 and H2 during this transient are such that they do not increase, and in some cases may even decrease, the current in film 12 associated with the storage of the data represented by the field H1. Then, as the field H2 collapses, it reverses any effect it had on such currents, whereby they continue at or return to their former level. Thus any current excursion in the memory film 12 during the "1" reading operation is away from rather toward the critical current thereof. On the other hand, when the flux H1 has a "0"-significant counter-clockwise direction (which would, in the absence of the sensing film 10 tend to have an opposite effect on storage in the memory film 12), the respective fluxes H1 and H2 are maintained separated by the film 10.

In addition to the control of the shape of the operating curve of FIG. 1 afforded by determination of the thickness of the sense or shield film 10 as aforedescribed, the geometry of the device can be tailored to alter the participation of the trapped flux of the memory film 12 in the operation of the film 10 and thus change, in effect, the scale factor of the vertical axis in FIG. 1. For example, by increasing the distance between the memory film 12 and the sense film 10, that portion H1 of the trapped flux of the memory film 12, which actually participates in the operation of the film 10 in accordance with the operating diagram, is decreased. Thus by altering the shape, spacing, and energization of any of the flux producing elements, the operating thresholds can be adjusted as desired to suit the characteristics of the film materials, thicknesses, and so forth which may be selected in any particular design. It is noteworthy, however, that the phenomenon described with respect to FIG. 1 as embodied in a device of the kind and characteristics aforedescribed can be made to be responsive to a few oersteds so that the apparatus can be made to be quite sensitive. This is of particular utility in trapped field memory organization and the like.

Other modifications which may be desired may include, for example, the use of a control connection (not shown) between the X and Y read select devices 26, 28 and the X and Y right select devices 22, 24 so that the former are synchronized for activation coincidentally with the latter for maintaining the sense plane 10 superconductive during the WRITE operation. It will be noted that in FIG. 1, relatively large values of H1 can be tolerated without driving the film 10 normal so long as there are corresponding values of H2 impressed on the other side of the film, and this characteristic can thus be utilized to maintain the film 10 superconductive at times when it would otherwise be driven normal.

Thus, while the invention has been particularly shown and described with reference to a preferred embodiment thereof, it will be understood by those skilled in the art that the foregoing and other changes in form and details may be made therein without departing from the spirit and scope of the invention.

What is claimed is:

1. In a cryogenic apparatus,
means providing a magnetic field the state of which is indicative of an operating condition in the apparatus,
and means for sensing said field comprising,
a film of super-conductive material disposed with said field at one side to intercept said field and when in its super-conductive state shield said shield from penetration to the other side of said film,
means adapted to provide a test field of a predetermined direction at said other side of said film,
and means responsive to the effect of the relative directions of said fields on the conductivity state of said film in the region of said film which when super-conductive acts to shield the fields from each other.

2. In a cryogenic apparatus,
means providing a magnetic field the state of which is indicative of an operating condition in the apparatus,
and means for sensing said indicative field comprising,
a film of super-conductive material disposed with said field at one side to intercept said field and when it its super-conductive state shield said field from penetration to the other side of said film,
means adapted to provide a test field at said other side of said film oriented to provide vector addition with said indicative field within said film, and
means responsive to the effect of said vector addition of said fields on the conductivity state of said film, said first means being disposed to be shielded from said test field by said film when the latter is super-conductive.

3. In a cryogenic apparatus,
means providing a magnetic field the state of which is indicative of an operating condition in the apparatus,
and means for sensing the direction of said indicative field comprising,
a film of super-conductive material disposed with said field at one side to intercept said field and when in its super-conductive state shield said field from penetration to the other side of said film,
means adapted to provide a test field at said other side of said film aligned with said indicative field,
and means responsive to the combined effect of said fields on the conductivity state of said film, said first means being disposed to be shielded from said test field by said film when the latter is super-conductive.

4. In a cryogenic apparatus,
means providing a magnetic field the state of which is indicative of an operating condition in the apparatus,
and means for sensing said indicative field comprising,
a film of super-conductive material disposed with said field at one side to intercept said field and when in its super-conductive state shield said field from penetration to the other side of said film,
means adapted to provide a test field at said other side of said film aligned with said indicative field,
said fields being adapted to switch said film to its normal conductivity state when said fields are antiparallel in their effect on said film and to constitute a less than critical field in their effect on said film when they are parallel,
and means responsive to the conductivity state of said film, said first means being disposed to be shielded from said test field by said film when the latter is super-conductive.

5. In a cryogenic memory apparatus,
super-conductive memory element menas providing a magnetic field the state of which is indicative of a data storage state in the apparatus,
and means for sensing the polarity of said data storage field comprising,
a film of super-conductive material disposed with said field at one side to intercept said field and when in its super-conductive state shield said field from penetration to the other side of said film,
means adapted to provide a test field at said other side of said film aligned with said data storage field,
said fields being adapted to switch said film to its normal conductivity state when said fields are antiparallel in their effect on said film and to constitute a less than critical field in their effect on said film when they are parallel,
said memory element being disposed to be shielded from said test field by said film when the latter is super-conductive and being adapted to withstand the effect of said test field without switching to its normal conductivity state when said film switches,
and means responsive to the conductivity state of said film.

6. Apparatus according to claim 5, wherein
said memory element is a flux trapping super-conductive film having a circulating current associated with said data storage field, and
said test field operates to decrease said circulating current.

7. In a cryogenic apparatus,
means providing a magnetic field the state of which is indicative of an operating condition in the apparatus,
and means for sensing said field comprising,
a film of super-conductive material disposed with said field at one side to intercept said field and when in its super-conductive state shield said field from penetration to the other side of said film,
means adapted to provide a test field at said other side of said film,
and means responsive to the combined effective of said fields on the conductivity state of said film, said first means being disposed to be shielded from said test field by said film when the latter is super-conductive,
said responsive means comprising a circuit element inductivity coupled to at least one of said fields.

8. In a cryogenic apparatus,
means providing a magnetic field the state of which is indicative of an operating condition in the apparatus,
and means for sensing the direction of said indicative field comprising,
a film of super-conductive material disposed with said field at one side to intercept said field and when in its super-conductive state shield said field from penetration to the other side of said film,
means adapted to provide a test field at said other side of said film aligned with said indicative field,
and means responsive to the combined effect of said fields on the conductivity state of said film, said first means being disposed to be shielded from said test field by said film when the latter is super-conductive,
said responsive means comprising a circuit element adjacent to said film inductivity coupled to the combination of said fields only when said film is in its normal conductivity state.

9. Apparatus in accordance with claim 8 wherein,
said circuit element is located on said one side of said film.

References Cited

UNITED STATES PATENTS

| | | | |
|---|---|---|---|
| 3,082,408 | 3/1963 | Garwin | 340—173.1 |
| 3,181,126 | 4/1965 | Green | 340—173.1 |
| 3,281,799 | 10/1966 | Van Lint | 340—173.1 |

TERRELL W. FEARS, *Primary Examiner.*

UNITED STATES PATENT OFFICE
CERTIFICATE OF CORRECTION

Patent No. 3,369,224

February 13, 1968

Rex H. Blumberg

It is certified that error appears in the above identified patent and that said Letters Patent are hereby corrected as shown below:

Column 5, line 23, "it" should read -- in --; line 69, "menas" should read -- means --. Column 6, line 37, "effective" should read -- effect --.

Signed and sealed this 3rd day of March 1970.

(SEAL)
Attest:

Edward M. Fletcher, Jr.
Attesting Officer

WILLIAM E. SCHUYLER, JR.
Commissioner of Patents